US012785016B2

(12) United States Patent
Giron et al.

(10) Patent No.: US 12,785,016 B2
(45) Date of Patent: Nov. 3, 2026

(54) DEVICE FOR SUPPLYING ELECTRICAL POWER WITH THERMAL PROTECTION

(71) Applicant: SAFRAN ELECTRICAL & POWER, Blagnac Cedex (FR)

(72) Inventors: Julien Giron, Moissy-Cramayel (FR); Edouard Bonnefous, Moissy-Cramayel (FR)

(73) Assignee: SAFRAN ELECTRICAL & POWER, Blagnac Cedex (FR)

( * ) Notice: Subject to any disclaimer, the term of this patent is extended or adjusted under 35 U.S.C. 154(b) by 200 days.

(21) Appl. No.: 18/704,607

(22) PCT Filed: Oct. 14, 2022

(86) PCT No.: PCT/FR2022/051937

§ 371 (c)(1),
(2) Date: Apr. 25, 2024

(87) PCT Pub. No.: WO2023/073298

PCT Pub. Date: May 4, 2023

(65) Prior Publication Data

US 2024/0429008 A1 Dec. 26, 2024

(30) Foreign Application Priority Data

Oct. 29, 2021 (FR) ...................................... 2111536

(51) Int. Cl.
*H01H 37/76* (2006.01)

(52) U.S. Cl.
CPC ....... *H01H 37/76* (2013.01); *H01H 2037/768* (2013.01)

(58) Field of Classification Search
CPC ........ H01H 37/76-761; H01H 2037/762-763; H01H 85/36
See application file for complete search history.

(56) References Cited

U.S. PATENT DOCUMENTS 2,300,142 A * 10/1942 Wood .................... H01H 85/36 337/292
3,198,914 A * 8/1965 Baran .................... H01H 85/36 337/414

(Continued)

FOREIGN PATENT DOCUMENTS

DE 102015111885 A1 1/2017
EP 0285044 A2 10/1988
EP 0285044 A3 10/1988

OTHER PUBLICATIONS

International Patent Application No. PCT/FR2022/051937, International Search Report and Written Opinion, Feb. 13, 2023, 12 pages (10 pages of original document, 2 pages of English translation).

*Primary Examiner* — Jacob R Crum
(74) *Attorney, Agent, or Firm* — Kilpatrick Townsend & Stockton LLP

(57) ABSTRACT

The invention relates to a device (1) for supplying electrical power, comprising: —a power source, —a system to be supplied with power, —a first busbar (2) connected to the system to be supplied with power, —a second busbar (3) connected to the CN power source, —an elastic element (13), —a heat-sensitive element (6) configured to melt at a predefined temperature, and—a holding system (7,8,9) allowing the two busbars (2,3) and the heat-sensitive element (6) to be held in contact, —the two busbars (2,3) making p electrical contact, —the elastic element (13) being configured to move the two busbars (2,3) away from each other and to break the M electrical contact, when the heat-sensitive element (6) melts.

11 Claims, 2 Drawing Sheets

(56) References Cited

U.S. PATENT DOCUMENTS

| | | | | |
|---|---|---|---|---|
| 6,855,008 | B1 | 2/2005 | Freitag et al. | |
| 9,407,083 | B1 * | 8/2016 | Holley | H02H 9/005 |
| 9,666,399 | B1 | 5/2017 | I | |
| 2008/0117016 | A1 * | 5/2008 | Yu | H01H 85/36<br>337/401 |
| 2016/0372878 | A1 * | 12/2016 | Wang | H01R 13/696 |
| 2018/0062374 | A1 * | 3/2018 | Yang | H01C 1/08 |
| 2019/0214208 | A1 * | 7/2019 | Galla | H01C 7/02 |

* cited by examiner

DEVICE FOR SUPPLYING ELECTRICAL POWER WITH THERMAL PROTECTION

TECHNICAL FIELD

The technical field of the invention is electrical protection devices, and more particularly, such devices with thermal tripping.

PRIOR ART

The transportation of high electric powers is generally carried out via a busbar. In order to protect a system powered by such a busbar from an overvoltage or from an excessive current, a thermal fuse is generally installed in the busbar so as to introduce a weak point. Indeed, it is made from materials more sensitive to a rise in temperature than the busbar so as to melt and interrupt the electrical conduction in the case of circulation of a power that is too high.

An alternative to such a thermal fuse is a bimetallic switch, one of the strips of which deforms under a rise in heat, effectively separating the two strips and interrupting the circulation of electrical power.

Nevertheless, regardless of the thermal device chosen, it forms an independent component that must be interposed on the busbar. This involves interfaces and additional parts in the electrical system, furthermore associated with a significant integration volume, and with an additional electrical resistance.

The increase in volume and in mass constitutes a problem, particularly significant in the aeronautical field.

DISCLOSURE OF THE INVENTION

The object of the invention is a device for suppling electrical power comprising:

- a power source,
- a system to be supplied with power,
- a first busbar connected to the system to be supplied with power,
- a second busbar connected to the power source,
- an elastic element,
- a heat-sensitive element configured to melt at a predefined temperature, and
- a holding system allowing the two busbars and the heat-sensitive element to be held in contact,
- the two busbars making electrical contact,
- the elastic element being configured to move the two busbars away from each other and to break the electrical contact, when the heat-sensitive element melts.

The elastic element can be disposed in a cavity.

The cavity can be formed by a perforated plate fastened to a busbar or by hollowing out a part of a busbar.

The elastic element can be at least one Belleville washer, a helical spring or a wave spring.

The busbar can be a braid or have a multi-strip structure or a high length/cross-section aspect ratio.

The elastic element can be comprised in a busbar, in particular in the form of a prestress.

The heat-sensitive element can be made of wax, of paraffin or of metal alloy.

The holding system can be a threaded rod provided with at least two nuts.

The holding system can comprise a screw insulator in each busbar, the insulators being disposed so that the threaded rod can be introduced simultaneously into the two insulators.

The holding system can be made of plastic resistant to high temperature or of ceramic.

The holding system can comprise the heat-sensitive element so as to break when the temperature exceeds the predefined temperature.

The device for suppling electrical power can comprise a retention tank configured so as to retain the heat-sensitive element after it has melted.

The heat-sensitive element can be disposed under the busbars so as to not form a thermal or electrical bridge when it melts.

Another object of the invention is an aircraft comprising a device for suppling electrical power as described above.

Such a device for suppling electrical power has the advantage of limiting the propagation of heat in the case of thermal runaway of the system to be supplied with power.

BRIEF DESCRIPTION OF THE DRAWINGS

Other goals, features and advantages of the invention will appear upon reading the following description, given only as a non-limiting example and made in reference to the appended drawings in which.

DETAILED DESCRIPTION

Busbars are usually made of aluminium or of copper and form a power electrical link. They connect in particular the input/output connectors to the internal elements of a piece of equipment.

The device for suppling electrical power according to the invention allows to electrically connect two busbars. The device for suppling electrical power comprises a holding system, an elastic element and a heat-sensitive element that is used in order to place the busbars in electrical contact.

During an overheating, the heat-sensitive element melts or softens, which allows to move the busbars away from each other, under the action of the elastic element. The electrical and thermal contact between the two busbars is thus broken.

Figure 1:
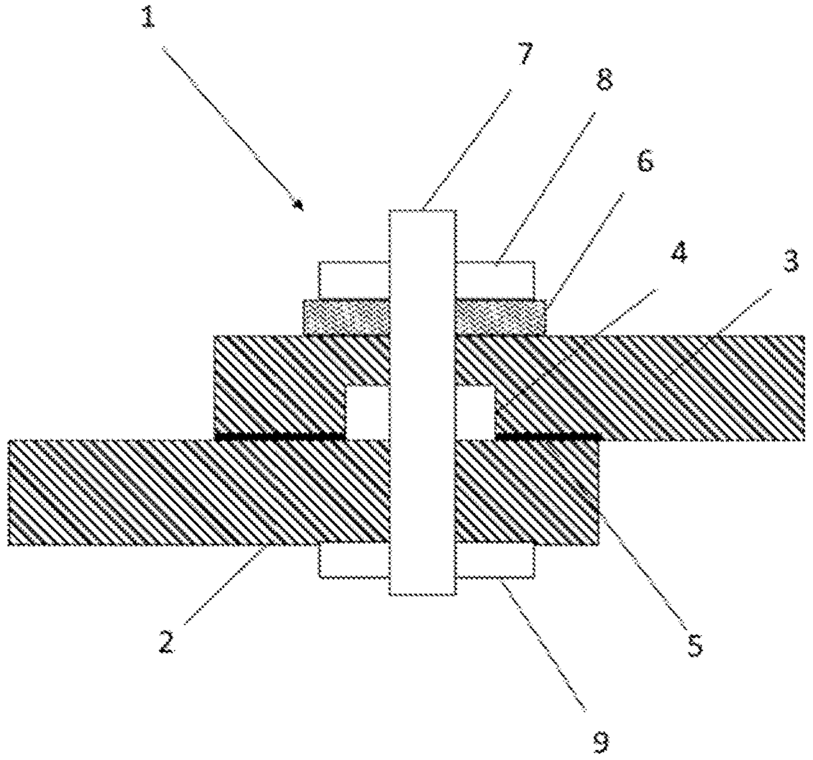
FIG. 1 illustrates the main elements of a device for suppling electrical power according to the invention.

FIG. 1 illustrates a device for suppling electrical power labelled 1 comprising a first busbar 2 connected to an electrical system to be supplied with power, not shown in the drawing, and a second busbar 3 connected to a power source also not shown in the drawing.

The second busbar 3 comprises a cavity 4 in which an elastic element not shown is disposed. Alternatively, the cavity 4 results from the fastening of a perforated plate 5 onto one or the other of the busbars 2,3.

The elastic element is disposed in the cavity 4 so as to move the busbars 2,3 away from each other. The elastic element can be a Belleville washer or a stack of such washers.

A heat-sensitive element labelled 6 is disposed on the second busbar 3. This element is chosen to melt at a predefined temperature, lower than a predefined temperature, in particular the temperature of damage to the busbars 2,3 or to the electrical system to be supplied with power.

The two busbars 2,3, the elastic element and the heat-sensitive element 6 are maintained in contact by a holding system 7,8,9 such as a threaded rod 7 provided with nuts 8,9. Other holding system are possible as long as they allow to oppose the force of the elastic element via the heat-sensitive element 6, without opposing the movement of the bus bars 2,3 away from each other once the heat-sensitive element 6 has melted.

In all the cases, the holding system 7,8,9 is insulating so as to not form an electrical conduction bridge after melting of the heat-sensitive element 6. The insulation can be obtained by using screw insulators inserted into teach of the busbars 2,3 and disposed so that a threaded rod can be inserted simultaneously into the two screw insulators. The insulation can also be obtained by using insulating washers between each nuts 8,9 and the busbars 2,3.

The elastic element is also electrically insulating, or associated with an electrical insulation allowing to insulate it from at least one of the busbars 2,3.

It is thus understood that during a heating of the busbars 2,3 beyond its melting or flow temperature, the heat-sensitive element 6 melts which frees a space between the second busbar 3 and the nut 8.

Under the effect of the elastic element, the second busbar 3 is moved away from the first busbar 2 without the position of the nuts 8,9 being modified.

Because of the absence of contact and of electrical conductor between the two busbars 2,3, the electrical conduction is interrupted.

Nevertheless, this first embodiment is limited by the flexibility of the second busbar 3 with regard to the force that can be exerted by an electrically insulating elastic element. Indeed, to effectively interrupt the electrical conduction, the two busbars 2,3 must be moved away from each other by a distance greater than the distance starting at which an electric arc can form for the electrical power applied. For example, to interrupt the circulation of a current under 200V, a distance of at least 3 mm is necessary.

In a second embodiment, all or a part of the second busbar 3 is replaced by a conductive braid having a greater flexibility or by a set of superimposed fine strips, conferring flexibility onto the whole.

Figure 2:
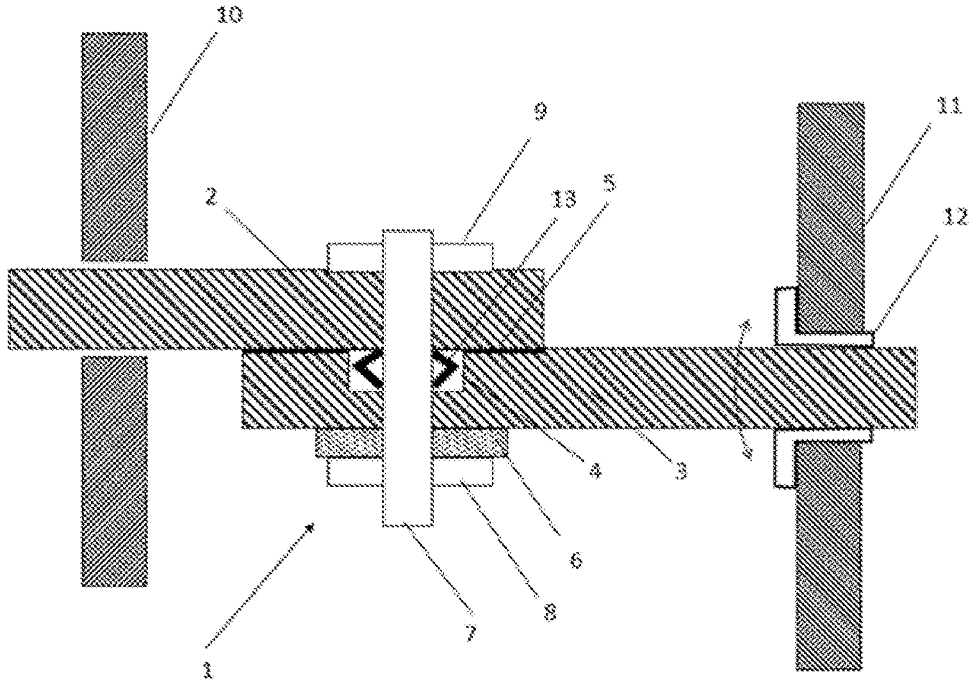
FIG. 2 illustrates the main elements of a device for suppling electrical power in its normal arrangement.
Figure 3:
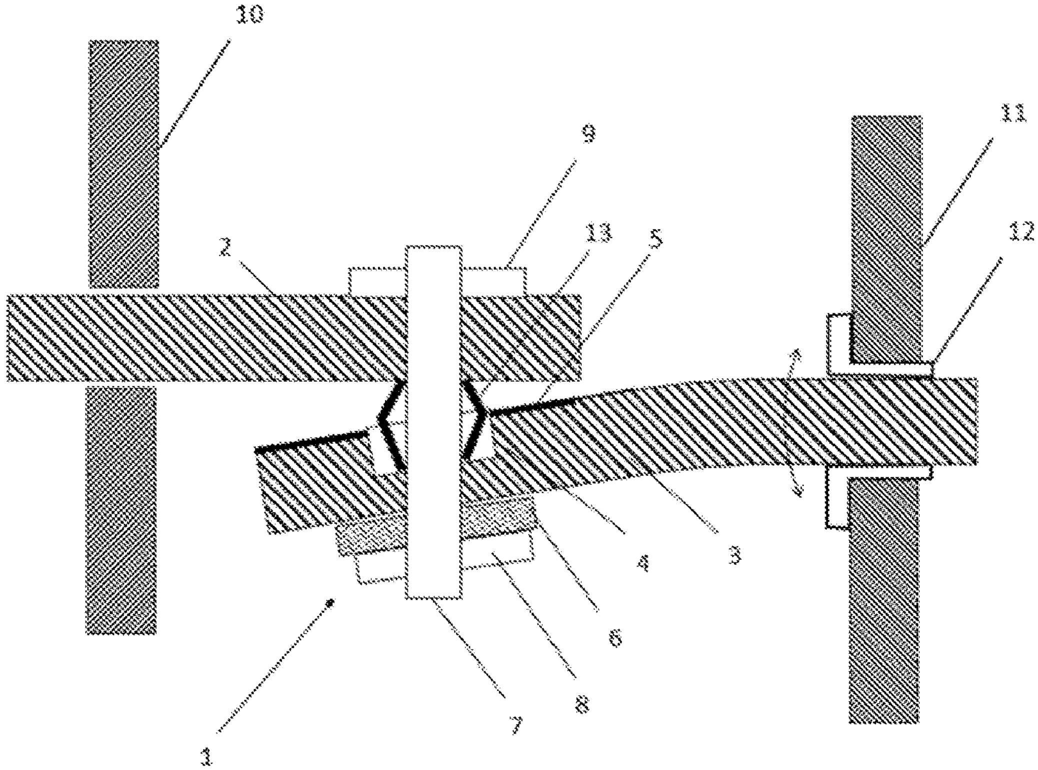
FIG. 3 illustrates the main elements of a device for suppling electrical power in its arrangement after a thermal incident.

In a third embodiment, illustrated by FIGS. 2 and 3, the device for suppling electrical power according to the invention still labelled 1, disposed so that the heat-sensitive element 6 is disposed under the busbars 2,3, is visible. Thus disposed, the material forming the heat-sensitive element 6 does not flow onto the busbars 2,3 when it is exposed to a high temperature, which allows to avoid the creation of a thermal bridge or of a possible short-circuit. Indeed, this material can be electrically conductive.

The holding system 7,8,9 is made of plastic resistant to high temperature or of ceramic.

The elastic element 13 is made of metal and associated with an insulating element, not illustrated, in particular made of plastic material or of ceramic.

The elastic element 13 is at least one Belleville washer, a helical spring, or a wave spring.

Alternatively, the elastic element 13 is made of plastic material resistant to high temperature.

In FIGS. 2 and 3, the device for suppling electrical power is disposed between the firewall fabric 10 and the liner 11 of a system to be supplied with power (not shown) connected to the first busbar 2.

The second busbar 3 is connected to the power source disposed outside of the liner 11 via an insert 12. The arrow illustrates that this second busbar 3 is designed so as to be able to be moved away from the first busbar 2 when the heat-sensitive element 6 melts or softens.

FIG. 2 illustrates the device for suppling electrical power in its normal arrangement, that is to say when the temperature of the busbars 2,3 is less than the melting or flow temperature of the heat-sensitive element 6. The device for suppling electrical power is thus electrically on.

FIG. 3 illustrates the device for suppling electrical power in its arrangement after a thermal incident, that is to say when the temperature of the busbars 2,3 is greater than the melting or flow temperature of the heat-sensitive element 6.

FIG. 3 illustrates a movement of the busbars 2,3 away from each other because of the extension of the elastic element 13 made possible by the melting of the heat-sensitive element 6. The device for suppling electrical power is thus no longer electrically on.

Figure 4:
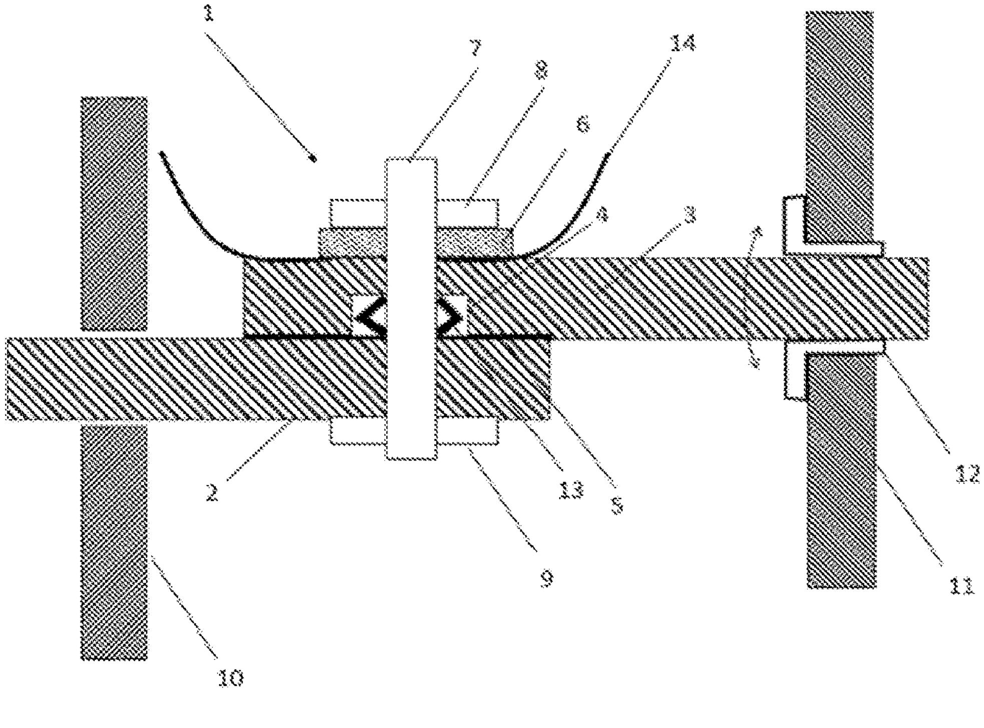
FIG. 4 illustrates the main elements of an alternative embodiment of a device for suppling electrical power according to the invention.

In an alternative embodiment based on the third embodiment and illustrated by FIG. 4, the heat-sensitive element 6 is disposed above the busbars 2,3. Nevertheless, to avoid a thermal or electrical bridge caused by the melting of the material of the heat-sensitive element 6, a retention tank 14 is arranged between said heat-sensitive element 6 and the busbars 2,3. This retention tank 14 is adapted to contain the material of the heat-sensitive element 6 while being chemically and thermally resistant.

In a specific embodiment, the heat-sensitive element melts at a temperature comprised in a predefined interval between 70° C. and 100° C. (this range of temperatures corresponds to a temperature above which the thermal runaway of the cells is inevitable and greater than the ambient temperatures encountered during normal use and normal storage).

In an alternative embodiment, the first busbar 2 connected to the system to be supplied with power is capable of transporting a thermal flow caused by an electrical malfunction of the system to be supplied with power. In order to increase the heat sensitivity of the device for suppling electrical power to this thermal flow, the first busbar is shorter than the second busbar, so that the device for suppling electrical power is more quickly exposed to the thermal flow.

The heat-sensitive element 6 is preferably a metal alloy with a known, chosen and controlled melting temperature. Alternatively, it can be a paraffin, a wax or a plastic sensitive to temperature so as to soften in a predetermined temperature range.

The busbar can be modified to improve the deflection. To do this, it can be flexible, in particular by being made with a fine multi-strip structure. Alternatively, the busbar is made as a metal braid. Finally, it can have a significant length so as to increase the deflection.

In a specific embodiment, the busbar can be designed so as to be prestressed in its rest position. To obtain this, the busbar can undergo a plastic deformation before its installation in the device for suppling electrical power. Placing the busbars in contact by the holding system 7,8,9 through the heat-sensitive element 6 allows to oppose this deformation in the rest position of the busbar.

During a heating, the melting of the heat-sensitive element 6 allows both to create a space towards which the prestressed busbar can move and to reduce the force applied by the holding system opposing the deformation. A movement of the busbar towards its rest position thus ensues.

In a specific embodiment, the holding system 7,8,9 comprises the heat-sensitive element 6 so that at least a part of the holding system 7,8,9 is capable of melting when it is subjected to a temperature greater than the predefined temperature. In such a system, it is not necessary to have available a distinct heat-sensitive element 6.

In one embodiment, the device for suppling electrical power has available a visual access to the cavity 4, allowing to ensure the correct mounting of the elastic element 13.

The invention claimed is:

1. Device for supplying electrical power, comprising:
- a power source,
- a system to be supplied with power,
- a first busbar connected to the system to be supplied with power,
- a second busbar connected to the power source,
- an elastic element,
- a heat-sensitive element configured to melt at a predefined temperature, and
- a holding system allowing the first busbar, the second busbar, and the heat-sensitive element to be held in contact, the holding system being a threaded rod provided with at least two nuts,
- the first busbar and the second busbar making electrical contact,
- the elastic element being at least one Belleville washer, a helical spring or a wave spring,
- the elastic element being configured to move the first busbar and the second busbar away from each other and to break the electrical contact, when the heat-sensitive element melts.

2. Device for supplying electrical power according to claim 1, wherein the elastic element is disposed in a cavity.

3. Device for supplying electrical power according to claim 2, wherein the cavity is formed by a perforated plate fastened to a busbar or by hollowing out a part of a busbar.

4. Device for supplying electrical power according to claim 1, wherein the busbar is a braid or has a multi-strip structure or a high length/cross-section aspect ratio.

5. Device for supplying electrical power according to claim 1, wherein the heat-sensitive element is made of wax, of paraffin or of metal alloy.

6. Device for supplying electrical power according to claim 1, wherein the holding system comprises a screw insulator in each busbar, the insulators being disposed so that the threaded rod can be introduced simultaneously into the two insulators.

7. Device for supplying electrical power according to claim 1, wherein the holding system is made of plastic resistant to high temperature or of ceramic.

8. Device for supplying electrical power according to claim 1, wherein the holding system comprises the heat-sensitive element so as to break when the temperature exceeds the predefined temperature.

9. Device for supplying electrical power according to claim 1, comprising a retention tank configured so as to retain the heat-sensitive element after it has melted.

10. Device for supplying electrical power according to claim 1, wherein the heat-sensitive element is disposed under the busbars so as to not form a thermal or electrical bridge when it melts.

11. Aircraft comprising a device for supplying electrical power according to claim 1.

* * * * *